Patented Aug. 3, 1943

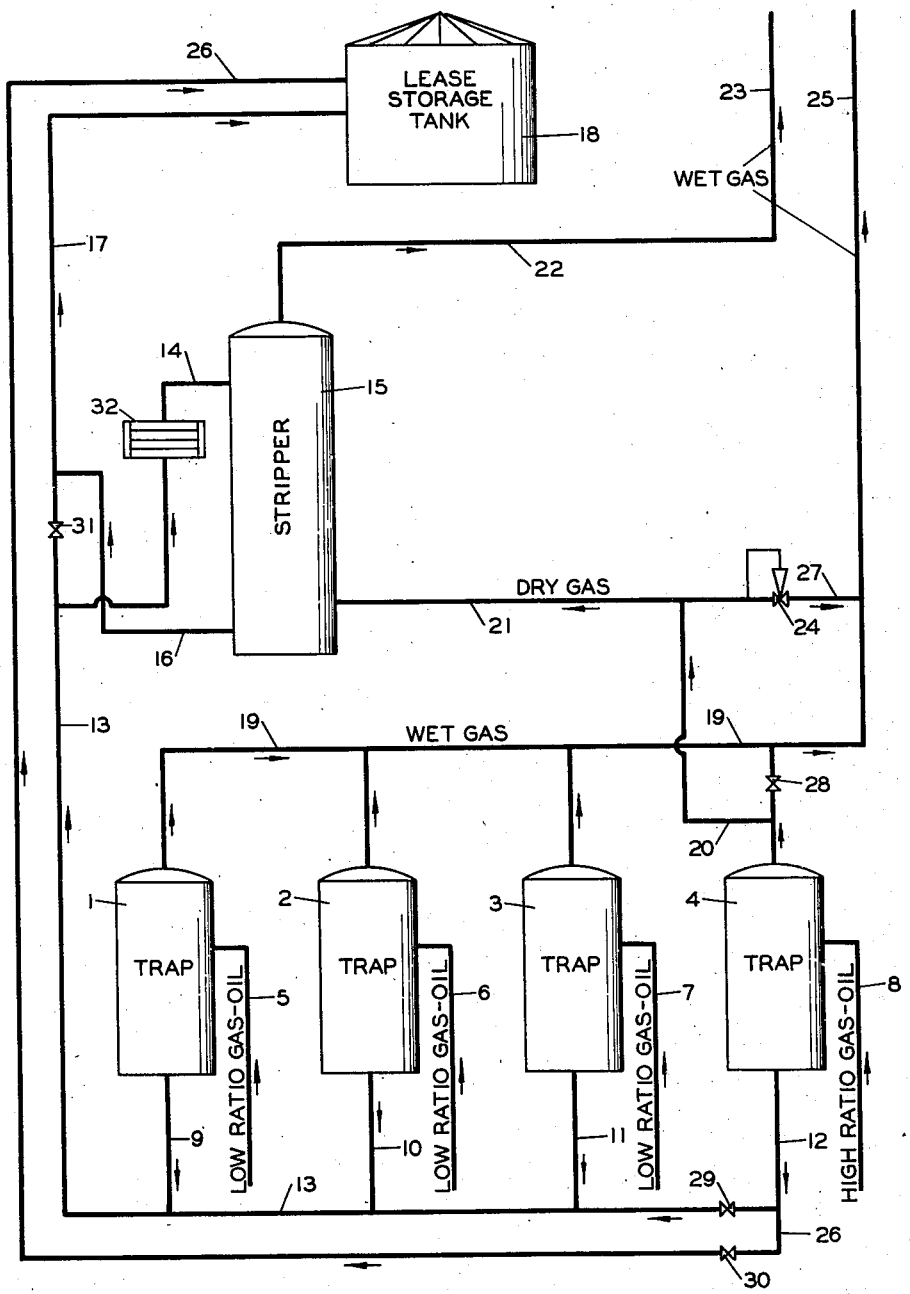

2,325,781

UNITED STATES PATENT OFFICE 2,325,781

GAS SEPARATION SYSTEM

Harold R. Legatski, Bartlesville, Okla., assignor to Phillips Petroleum Company, a corporation of Delaware Application March 3, 1941, Serial No. 381,563

1 Claim. (Cl. 183—114.5)

This invention relates to the separation of the more volatile components from a fluid mixture and more particularly, it relates to a process for increasing the separation or recovery from crude oils of normally gaseous components and the lighter liquid components ordinarily known as natural gasoline.

This invention is particularly adaptable to the removal from crude oil of the hydrocarbons normally contained in natural gasoline and polymerization feed stocks. By application of my process substantially all of the propane and butanes, and a large part of the pentanes and some higher boiling hydrocarbons are removed from crude oils thereby presenting a marked increase in the removal of these relatively low boiling constituents over the removal by conventional methods.

In the production of crude oil, the fluid produced from an oil well comprises oil associated with varying amounts of gas. In common oil field practices, the gas is separated from the oil in "separators." If there is only a relatively small amount of gas, it may be vented from the separator to the atmosphere and lost; or the gas may not be separated from the oil at the well, in which case, the fluid can be conducted by pipeline or other means to a central separator system in which the gas is separated from the oil. In systems such as these, the amount of gas evolved from the fluid is controlled by the separator or trap pressure. As is known, the lower the separator operating pressure, the greater will be the evolution of the dissolved gases. The giving off or flashing of the dissolved gases is accompanied by the vaporization of other hydrocarbons which are normally liquid. In a field from which sufficient gas containing vapors of easily condensable hydrocarbons is produced it is often economical to install natural gasoline extraction plants and by their operation produce the so-called natural gasoline. These plants may be of the conventional compression type, absorption type, or a combination of these.

Natural gases carry various amounts of condensable hydrocarbons or natural gasoline. Frequently, gas evolved from a well fluid containing only a relatively small amount of gas, will be quite rich in hydrocarbon condensables. And conversely, a gas evolved from a well fluid which contains large amounts of gas, will usually be comparatively lean with regard to the amount of condensables. These rich gases and the leaner gases, if these latter contain sufficient condensables, are frequently stripped of their natural gasoline content. It has been found desirable to attempt to devise methods to increase the yield of natural gasoline from well gases. One method of increasing this yield is to increase the efficiency of the recovery process and a second method is to process wetter gases. This first alternative is limited by the amount of condensable hydrocarbons in the gas while the second alternative is less restricted. In the disclosure that follows, I describe in detail a process for increasing the amount of condensable hydrocarbons in a natural gas, thereby increasing the possible recovery and output of natural gasoline. In any process in which gas, or as it may be called, "stripper gas" or "dry gas," is contacted with a liquid petroleum hydrocarbon mixture for stripping purposes, it is obvious to those skilled in the art, that the lowest boiling constitutents are first removed. It is desirable to so treat petroleum crude oils for the more nearly complete removal of the light volatile ends in order to reduce subsequent evaporation losses during storage and transit of the crude oil. In addition, the removed hydrocarbons, or natural gasoline as frequently termed, contain materials used in the manufacture of polymerized gasoline, and the increased recovery of polymerization feed stocks is an item of importance.

An object of this invention is to furnish a method for the extraction and recovery from crude oils of condensable hydrocarbons called natural gasoline.

Another object of this invention is to furnish a method for increasing the recovery of natural gasoline from crude oils over present methods.

Still another object of this invention is to furnish a process for the more nearly complete removal of the light, volatile ends from a crude oil and convert them into the form of a wet gas suitable as charge stock for a natural gasoline extraction plant.

Other objects and advantages will be apparent to those skilled in the art from a careful study of the following description.

The figure illustrates one embodiment of my invention.

Referring to the figure, 1, 2, 3 and 4 refer to gas-oil traps or separators, lines 5, 6, 7 and 8 represent the respective well fluid inlet lines to the said separators. Lines 9, 10, 11 and 12 are the oil outlet lines from said separators, and these are manifolded into one or more crude oil gathering lines, for example, line 13. Liquid inlet line 14 enters above the top plate of the stripper tower 15 while line 16 conducts the liquid from the bottom of said tower to trunk crude oil line 17 and thence to lease storage tank 18. Valve 31 may be closed or open depending upon whether stripper tower 15 is in operation or not. 29 and 30 are valves in the crude oil lines 13 and 26 respectively.

Gas outlet lines from the top of the several separators are manifolded to the gas gathering line 19, and this line in turn discharges into the trunk or main wet gas line 25 which ordinarily transfers said wet gas to a gasoline extraction plant not shown. 28 is a valve in gas line from trap 4. Pressure controller valve 24 in gas line 27 controls the pressure of dry gas from trap 4.

The production of oil is usually accompanied by production of more or less gas. As mentioned above, gas produced from oil containing relatively small proportions of gas is frequently rich in condensable hydrocarbons, while gas produced from oil containing large amounts of gas frequently contains little or essentially no condensables. The former gas is termed "wet" gas and the latter "dry" gas.

In some gas-oil producing fields, production is characterized by high and low gas-oil ratio wells scattered throughout the field. And in many instances, the low gas-oil ratio wells produce relatively small quantities of gas as wet gas, and the high gas-oil ratio wells produce large quantities of essentially dry gas.

For the operation of my process in which appreciably large quantities of dry gas are required, the source of the dry gas is immaterial. The gas may originate directly from producing wells or it may be residue gas from a gasoline extraction plant.

In the operation of my process, crude oil from the several field traps, for example, traps 1, 2, 3 and 4 in the figure, is manifolded into a main line, as line 13, and finally discharged into the upper part of a conventional stripping tower, as stripper 15. The oil flows downward in said stripper and countercurrent to a stream of relatively dry gas. The dry gas upon intimate contact with the downward flowing crude oil removes or strips from the oil low boiling hydrocarbons. This gas, which now contains low boiling easily condensable hydrocarbons formerly in the crude oil has become a wet gas, and it may be led from the stripper tower 15 through lines 22 and 23 to a gasoline extraction plant, not shown. After extraction of the gasoline content, the stripped or dry gas may be circulated back through the above disclosed stripper tower 15 through lines not shown, may be utilized in the manufacture of carbon black, or may serve as fuel.

In case dry gas is produced from an adjacent well, the diagrammatic plan of the operation is well illustrated in the accompanying figure. The traps, such as 1, 2 and 3 remove relatively small quantities of wet gas from the oil produced from low gas-oil ratio wells. This wet gas passes directly by way of gathering lines to a gasoline extraction plant, not shown. Separator 4 illustrates a trap or separator in which relatively dry gas is separated from crude oil produced from a high gas-oil ratio well or wells. The dry gas leaves this trap through line 20, passes through line 21 and enters the lower portion of stripper 15. In this operation, valve 28 is closed to prevent escape of dry gas from trap 4 into wet gas line 19. The pressure of the stripper system is controlled by controller 24; when pressure in line 20—21 exceeds a certain value, controller 24 opens allowing the excess gas to escape through line 27 into line 25. When stripper tower is in operation, it is obvious that valve 31 in the crude oil line should be closed.

In this operation, the gas, after absorbing low boiling hydrocarbons from the oil in stripper 15, emerges from said stripper passing through line 22—23 to a gasoline extraction plant, not shown, or to other uses or storage. In case the crude oil from the high ratio gas-oil wells becomes well denuded of its light ends on giving off the large volume of gas in trap 4, this oil may bypass the stripper tower 15 by the proper manipulation of valves 29 and 30 and pass directly to storage 18 through line 26.

In practicing my invention at least three operating variables or conditions are controlled in an effort to increase the efficiency of the removal of the relatively low boiling hydrocarbons from the crude oils. These three variables are pressure, temperature and concentration. By operating the low gas-oil ratio separators 1, 2 and 3 at low pressures, the yield of wet gas evolved and separated therein is materially increased. This wet gas ordinarily passes directly to a gasoline extraction plant. The relatively dry gas evolved in trap 4, which represents one or more high gas-oil ratio separators may be economically too lean in condensable hydrocarbons to be processed directly in an extraction plant. I have found that this dry gas can be used as a stripping means to remove additional condensables from the crude oil from the low gas-oil ratio traps as 1, 2 and 3, in stripping tower 15. This stripping tower is operated at a relatively low pressure to permit more nearly complete extraction of the desired hydrocarbons.

During the warmer months of the year, the oil may acquire sufficient heat from long crude oil gathering lines to assist in the separation and stripping of the light ends therefrom. At other times, however, it may be advisable to supply artificial heat to the oil, as in exchanger 32.

The concentration factor is at least partially controlled by the relative amount of dry gas passed through the stripping tower 15. The concentration factor referred to herein is intended to mean the concentration of the condensable hydrocarbons in the dry extraction gas. From partial pressure considerations, it is obvious to one skilled in the art, that the lower the partial pressure of the condensable constituents in the gas in relation to their partial pressure from the crude oil, the more nearly complete will be their extraction from the crude oil by the stripper gas. With a given amount of crude oil, the less stripper gas contacted with said oil, the less complete will be the removal of condensable hydrocarbons therefrom, and conversely to increase removal of said condensable hydrocarbons from the crude oil the flow of stripping gas should be increased. Upon increase in the amount of stripping gas used, the concentration of condensable hydrocarbons therein will be decreased, but the total amount of said condensables transferred from the crude oil to the stripper gas will be increased.

While one modification of my process has been illustrated and described, it will be obvious to those skilled in the art that operating conditions such as temperature, pressure, volume of dry gas used as stripping agent, and other variables such as piping hookup, etc., may be varied within wide limits and yet remain within the intended scope of my invention.

What I claim is:

In a process for recovering volatile condensable hydrocarbons from the liquids produced from oil wells producing fluids having relatively low gas-oil ratios and from the gas produced from oil wells producing fluids having relatively high gas-oil ratios, the steps comprising separating a liquid component and a gaseous component from the fluids produced at low gas-oil ratios, said gas being a wet gas containing a relatively high percentage of condensable hydrocarbons, separating a liquid component and a gaseous component from the fluid produced at high gas-oil ratios, said gas being a dry gas containing a relatively low percentage of condensable hydrocarbons, contacting the liquid component of the fluid produced at low gas-oil ratios with the gaseous component of the fluid produced at high gas-oil ratios, whereby volatile condensable hydrocarbons are transferred from the liquid component to the gaseous component forming a second stream of wet gas, and separating the second stream of wet gas from the liquid component.

HAROLD R. LEGATSKI.